INVENTORS:
JERRY HIONIS,
EUGENE M. SMITH,

BY William Freedman
ATTORNEY

United States Patent Office 3,521,080
Patented July 21, 1970

3,521,080
CLOSING CONTROL SCHEME FOR AN ELECTRIC CIRCUIT BREAKER
Jerry Hionis, Woodlyn, and Eugene M. Smith, West Chester, Pa., assignors to General Electric Company, a corporation of New York
Filed Nov. 5, 1968, Ser. No. 773,536
Int. Cl. H02h 3/08
U.S. Cl. 307—143                          6 Claims

ABSTRACT OF THE DISCLOSURE

Discloses a closing-control scheme for a circuit breaker in which closing-control power is developed by discharging a capacitor upon operation of a closure-initiating switch. "Pump-free" performance is obtained by preventing the capacitor from being recharged so long as the operator holds the closure-initiating switch in its operated position.

BACKGROUND OF THE INVENTION

This invention relates to a closing control scheme for an electric circuit breaker and, more particularly, to a closing control scheme which needs no cut-off, or Y relay, to provide the usual protection against "pumping."

A basic requirement of a closing control scheme for a circuit breaker is that it be pump-free. In other words, only one closing operation of the circuit breaker should result from each closing operation of a manually-operated closure-initiating device, even though the circuit breaker trips open while the initiating device is being held in a closed position. To satisfy this requirement, it has been common to rely upon a control scheme of the so-called X–Y type. In this type of scheme, a manually-operated control switch is closed to complete an energizing circuit for the usual closing, or X, device, which responds by producing closing of the breaker. At the end of the closing stroke, a cut-off, or Y, relay is automatically caused to change its operative position thereby to open the circuit for the closing device and is maintained in its new position to prevent the closing device from being again operated so long as the control switch is held closed.

A problem with the X–Y type to control is that the Y relay is sometimes susceptible to being jarred out of its pump-preventing position by mechanical shocks, for example, the shock which accompanies closing by a stored-energy closing device against light currents. This can defeat its ability to prevent pumping. Another problem with the X–Y type of control is that the Y relay arcs across its contacts each time the breaker is closed; and such arcing erodes the contacts, necessitating maintenance thereof more frequently than might be desired. Still another problem is that the usual X–Y scheme requires control power at the end of its closing stroke in order for the Y relay to operate properly. If there is a likelihood that control power will be lost during this period, then the usual X–Y scheme cannot be used.

SUMMARY

An object of our invention is to provide a closing control which is capable of preventing pumping without reliance on such a Y relay and without requiring control power to be available at the end of the closing stroke.

In carrying out the invention in one form, we connect a capacitor and a resistor in series across the terminals of the control power circuit. Across the capacitor we connect the series combination of the actuating part of a closing initiator, a manually-controlled closure-initiating switch, and a b switch that is closed when the breaker is open and open when the breaker is closed. Closing of the manually-controlled switch when the capacitor is charged and the breaker is open causes the capacitor to discharge through said actuating part via said series combination to initiate circuit-breaker closing by a closing operator. Reset means is provided for restoring the closing operator to a reset condition wherein operation of the closing initiator can again cause the closing operator to close the breaker if the breaker is then open. The capacitor is chargeable through said resistor by current supplied through said terminals. First disabling means prevents the capacitor from being charged during the period when the reset means is restoring the closing operator to its reset condition. Second disabling means comprising the aforesaid series combination prevents the capacitor from being charged upon completion of said restoring operation if the breaker should then be open and the manually-controlled switch should have been held closed since initiation of the breaker-closing operation.

BRIEF DESCRIPTION OF DRAWINGS

For a better understanding of the invention, reference may be had to the following description taken in conjunction with the accompanying drawings wherein.

DESCRIPTION OF PREFERRED EMBODIMENT

Figure 1:
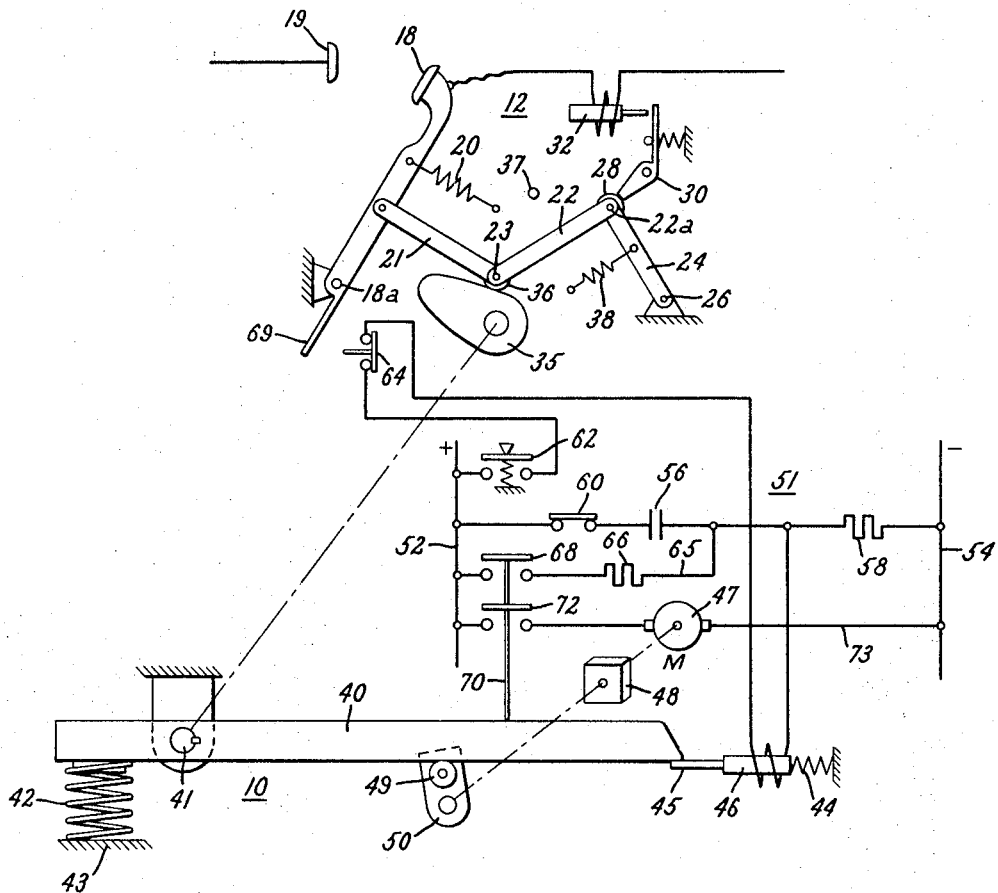
FIG. 1 is a schematic illustration of a closing control arrangement embodying one form of our invention. The closing device in this figure is a stored-energy device shown in its charged condition.

Referring now to FIG. 1, there is shown an electric circuit breaker 12 and a stored energy operator 10 which is used for closing the circuit breaker. The circuit breaker 12 can be of any suitable conventional type and is accordingly shown in schematic form only.

As shown in FIG. 1, the circuit breaker 12 comprises a pair of relatively-movable interrupting contacts 18 and 19. One of these contacts 18 is pivotally mounted at 18a and is biased to the open-circuit position shown by a suitable spring 20. Closing forces are transmitted to the movable contact 18 by a conventional trip-free operating mechanism which comprises a pair of toggle links 21 and 22 pivotally joined together by a knee 23. One of the toggle links 21 is pivotally connected at its opposite end to movable contact 18, whereas the other of the toggle links 22 is connected by a pivot pin 22a to the upper end of a guide link 24. This guide link 24 is pivotally supported at its lower end on a fixed fulcrum 26. The pivot pin 22a carries a latch roller 28 which cooperates with a suitable trip latch 30. So long as the trip latch 30 remains in the latch position shown, the toggle 21, 22 is capable of transmitting thrust to the movable contact 18. Thus, when the knee 23 is lifted from the position shown in FIG. 1, the toggle 21, 22 is extended and drives the movable contact 18 toward the closed-circuit position.

This lifting of the knee 23 is accomplished by the action of a suitable rotatable cam 35 cooperating with the usual roller 36 which is mounted at the knee 23. When this cam 35 is rotated clockwise from its position of FIG. 1, it lifts the knee and produces closing in the manner described hereinabove. Preferably, the cam 35 is arranged to drive the toggle 21, 22 slightly overcenter and against a stop 37 so that the movable contact will be held in closed-circuit position even when the cam 35, is returned to its original position of FIG. 1.

Should the latch 30 be tripped when the breaker is closed or even during the closing stroke, the toggle 21, 22 will be rendered inoperative to transmit thrust to the movable contact 18. As a result, the opening spring 20 will be free to drive the movable contact 18 to its open-circuit position. A suitable resetting spring 38 cooperates with the guide link 24 to reset the mechanism to the latched position after it has been tripped. The above-described tripping of the latch 30 is accomplished in response to predetermined electrical conditions by relying upon a suitable tripping solenoid 32. For illustrative purposes, the tripping solenoid 32 is shown connected in series with the circuit through contacts 18, 19 so that it can respond to an overcurrent condition in this circuit to effect tripping of latch 30.

For driving the cam 35 clockwise to produce the above-described closing of the circuit breaker 12, the stored energy operating device 10 is relied upon. Referring to FIG. 1, this operating device 10 comprises a pivotally mounted lever 40 which is keyed to a drive shaft 41. Drive shaft 41 is rotatably mounted in conventional bearings and suitably coupled to the cam 35. Thus, when lever 40 is driven clockwise from its position of FIG. 1, its acts through cam 35 to produce circuit breaker closing.

For imparting such clockwise closing motion to the lever 40, the heavy compression spring 42 is provided. This compression spring 42 reacts at its lower end against a stationary abutment 43 and at its upper end against an extension of lever 40. The compression spring 42 is releasably held in a charged position, which is shown in FIG. 1, by means of a suitable latch schematically illustrated at 45. This latch 45 is operated by a solenoid 46, which, upon effective energization, drives the latch to the right against spring 44 to release it from restraining relationship with lever 40. When latch 45 is thus released, compression spring 42 quickly discharges and drives lever 40 and shaft 41 clockwise to close the circuit breaker.

For recharging the closing spring 42 to enable it to provide force for another closing operation, a charging motor 47 and a charging crank 50 are provided. Motor 47 is connected to the charging crank 50 through reduction gears, a slip clutch, and an overrunning clutch, all diagrammatically indicated at 48. These latter components may be of any suitable conventional form, such as shown for example in U.S. Pats. 2,674,345—Favre and 2,667,076—Favre, both assigned to the assignee of the present invention. The primary purpose of the overrunning clutch is to assure that the desired high speed discharge of closing spring 42 will not be impeded by the inertia of the reduction gears or the armature of motor 47. To this end, the overrunning clutch permits the closing spring 42, in discharging, to drive the charging crank 50 counterclockwise independently of the reduction gears and the motor armature.

Figure 2:
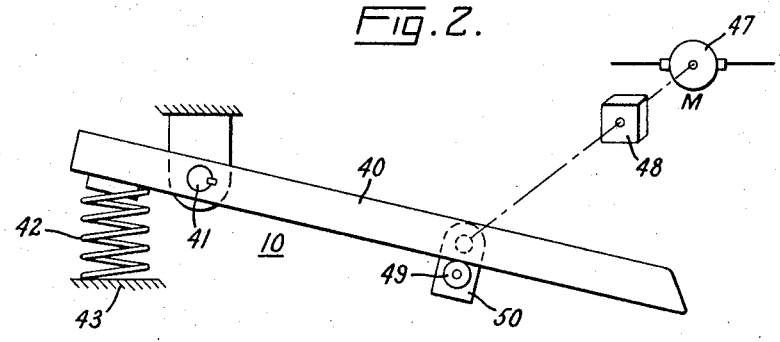
FIG. 2 shows the closing device in its discharged condition.

At the end of the closing-spring discharge operation, lever 40 is in the position shown in FIG. 2. The charging motor 47, having been energized in response to the initial discharge of spring 42, as will soon be described, responds by driving the charging crank 50 counterclockwise from its position of FIG. 2 back to its position of FIG. 1. During this counterclockwise motion of charging crank 50, a crank pin 49 on the crank 50 engages the underside of lever 40, driving the lever counterclockwise about the axis of shaft 41 back to its position of FIG. 1. This recharges the spring 42, restoring it to its position of FIG. 1. Since charging mechanisms of this type are well known, as will be apparent from the aforesaid Favre patents, a more detailed description thereof is considered unnecessary.

For controlling the latch 45 that initiates discharge of closing spring 42, we provide a closing-control circuit 51. This closing-control circuit 51 comprises a pair of spaced terminals 52 and 54 between which a capacitor 56 and a resistor 58 are connected in series. Also in series with capacitor 56 and resistor 58 is a conventional latch-checking switch 60, which is closed only when the trip latch 30 of the circuit breaker 12 is reset (as shown, for example, in FIG. 1).

Connected across the capacitor 56 is the series combination of a manually-operable closing switch 62, a b switch 64, and the operating solenoid 46 of the closing release latch 45. If the capacitor 56 is assumed to be charged, closing of the manual switch 62 will cause the capacitor 56 to discharge through the parts 60, 62, 64, 46 connected across its terminals, thus effectively energizing the solenoid 46 and causing it to trip closing-release latch 45 to initiate a breaker-closing operation.

The switch 64 is a conventional b switch, i.e., a switch which is closed when the circuit breaker contacts are open and open when the circuit breaker contacts are closed. In the schematic showing of FIG. 1, a lever 69 connected to the circuit breaker contact arm 18 opens the normally-closed switch 64 at the end of a circuit breaker closing operation. Switch 64, when open, serves the conventional function of preventing a closing operation from being attempted by the closing device 10 when the circuit breaker is already closed.

For preventing charging of the capacitor 56 under certain circumstances, soon to be described, we provide a disabling circuit 65 which is connected across the terminals of the capacitor 56. This disabling circuit 65 comprises the series combination of a resistor 66 and a limit switch 68. Resistor 66 has a very low resistance compared to that of the resistor 58 which is in series with capacitor 56. When the closing spring 42 is in its completely charged condition of FIG. 1, the limit switch 68 is open; but if the closing spring 42 is released, limit switch 68 closes and remains closed until the closing spring is restored to its fully recharged condition by the previously-described recharging operation. For controlling the switch 68 in this manner, an operating rod 70 controlled by the position of closing lever 40 is provided.

For energizing the motor 47 to effect a recharging operation of the closing spring 42, we provide a normally-open switch 72 which closes in response to initiation of a closing spring discharge operation. When switch 72 thus closes, it connects the motor across the terminals 52, 54 via the energizing circuit 73. The motor 47 responds by performing the previously-described recharging operation. At the end of the recharging operation, the closing lever 40 is returned to its position illustrated in FIG. 1, thereby opening the switch 72 to deenergize the motor 47. In FIG. 1, the charging crank 50 is slightly overcenter with respect to the line of action of lever 40, thus assuring that the charging crank 50 will be driven clockwise by discharge of closing spring 42. The closing-release latch 45, of course, prevents such discharge of the closing spring until released by solenoid 46.

The manner in which the circuit 51 functions to prevent pumping will now be described. Assume that the parts are in the position of FIG. 1, that the capacitor 56 is fully charged, and that the closing switch 62 is then closed to initiate a circuit-breaker closing operation. This causes the capacitor 56 to discharge through parts 60, 62, 64, 46 thereby causing solenoid 46 to release the closing spring 42, which responds by discharging to close the circuit breaker. Immediately following this, the charging motor 47, which is energized by closing of switch 72, quickly recharges the spring 42, finally restoring the parts to the position of FIG. 1. If the circuit breaker, in closing, closed on a fault, the tripping solenoid 32 would immediately trip the circuit breaker open. This opening operation will be completed long before the recharging operation is completed.

Even if the operator has continued holding the closing switch 62 in closed position during this entire period, no additional circuit-breaker-closing operations (or pumping) will occur. This is the case because the capacitor 56 must be recharged in order to make available energy to initiate another closing operation, and such recharging of the capacitor is prevented. During the recharging operation of the closing spring 42, recharging of the capacitor 56 is prevented by the then-completed disabling circuit 65 shunting the capacitor 56. Since the switch 68 in this disabling circuit 65 is closed, the resistors 66 and 58 are in series across the terminals 52, 54. Since resistor 66 has a very small resistance compared to that of resistor 58, only a very small percentage of the voltage between the terminals appears across the resistor 66, and hence across capacitor 56, thus preventing the capacitor 56 from acquiring a significant charge during this interval.

At the end of a spring recharging operation, switch 68 is opened, but the capacitor 56 still cannot acquire a significant charge if the manually-controlled closing switch 62 is still being held closed. This is the case because the coil of solenoid 46 which is then in series with resistor 58 and in parallel with capacitor 56 has a very low resistance compared to that of resistor 58, thus allowing very little of the voltage between terminals 52 and 54 to appear across the solenoid coil and hence across the capacitor 56. It is only when the closing switch 62 is allowed to open that capacitor 56 can acquire a charge since it is only then that the low resistance coil of solenoid 46 is effectively removed from shunting relationship with capacitor 56. Thus, since only one circuit-breaker closing operation can occur in response to a single closing of the manually-controlled closing switch 62, it will be apparent that our control has the desired freedom from "pumping."

When the manually-operated switch 62 is finally released to open, the capacitor 56 is no longer shunted by either disabling means 65 or disabling means 62, 64, 46, and thus the capacitor 56 is free to be charged from the voltage appearing between terminals 52, 54. The speed of charging is determined primarily by the R-C time constant of the circuit 56, 58.

In addition to being pump-free, our control circuit has the ability to prevent operation of the closure-initiating latch 45 at all times when the closing spring 42 is not fully charged. This is the case because the switch 68 is closed at all such times, thus rendering the disabling circuit 65 operative to prevent the capacitor 56 from being charged at all such times. So long as the capacitor 56 is in a discharged condition, no energy is available from the control circuit to release the closure-initiating latch 45.

It should be apparent that the illustrated control has no Y or cutoff relay, such as is present in the usual X–Y closing control schemes. Thus, it is not susceptible to misoperation from the kind of mechanical shocks which might jar a Y relay out of its intended position. Nor does it require the maintenance that is required when there is a Y relay with its arcing contacts.

Another advantage that our circuit has over the usual X–Y closing scheme is that its antipump properties are not impaired by a temporary loss of control power at the end of a closing stroke of the circuit breaker. In this respect, note that there are no switches in either of the disabling circuits 65 or 62, 64, 46 which would change position in response to a loss of control power across terminals 52, 54. Even the limit switch 68, which is then closed, would remain closed until the motor 47 resumed and completed the charging of closing spring 42.

Although my closing-control circuit is especially attractive for use with a stored-energy closing device, as shown, it can also be applied to a nonstored energy type closing device. This can be done by substituting for the normally-open limit switch 68 a normally-open switch that would be closed whenever the closing device is in a nonreset condition. For example, in a mechanism which uses a solenoid as its closing device, we would use instead of limit switch 68 an *a—a* switch that is open when the solenoid armature is in its reset position but which is closed whenever the solenoid armature is out of its reset position. Such a switch, like switch 68, would serve to prevent the capacitor 56 from being charged whenever the closing device is in a nonreset condition.

While we have shown and described a particular embodiment of our invention, it will be obvious to those skilled in the art that various changes and modifications may be made without departing from our invention in its broader aspects; and we, therefore, intend in the appended claims to cover all such changes and modifications as fall within the true spirit and scope of our invention.

What we claim as new and desire to secure by Letters Patent of the United States is:

1. In a pump-free closing-control scheme for the closing operator of an electric circuit breaker, the combination of:
   (a) a pair of terminals for supplying control power to said closing control scheme,
   (b) a capacitor and a resistor connected in series across said terminals,
   (c) an electroresponsive closing initiator having an actuating part and operable upon effective energization of said actuating part to cause said closing operator to produce a circuit-breaker-closing operation,
   (d) a manually-controlled switch connected in series with said actuating part and closable to produce effective energization of said actuating part,
   (e) a *b* switch that is closed when the circuit breaker is open and open when the circuit breaker is closed,
   (f) means connecting the series combination of said actuating part, said manually-controlled switch, and said *b* switch across said capacitor but not across said resistor so that closing of said manually-controlled switch when said capacitor is charged and said circuit breaker is open causes said capacitor to discharge through said actuating part, but not through said resistor, to initiate a circuit-breaker-closing operation,
   (g) reset means for restoring the circuit-breaker-closing operator to a reset condition wherein operation of said closing initiator can again cause said operator to close said circuit breaker if the circuit breaker is then open,
   (h) said capacitor being chargeable through said resistor by current supplied through said terminals,
   (i) first disabling means for preventing said capacitor from being charged during the period when said reset means is restoring said closing operator to said reset condition, and
   (j) second disabling means for preventing said capacitor from being charged upon completion of said restoring operation if the circuit breaker should then be open and the manually-controlled switch should have been held closed since initiation of the circuit-breaker-closing operation.

2. The closing control scheme of claim 1 in which:
   (a) said closing operator is a stored-energy device which discharges to produce closing of said circuit breaker upon operation of said closing initiator,
   (b) said reset means comprises a motor for recharging said stored-energy device, thereby restoring said closing operator to a reset condition, and
   (c) said first disabling means comprises means for preventing said capacitor from being charged during the time said motor is recharging said stored-energy device.

3. The closing control scheme of claim 1 in which:
   (a) said first disabling means comprises a second resistor and a disabling switch operable during restoration of said closing operator to its reset condition to connect said second resistor across said capacitor,
   (b) said second resistor has a very low resistance compared to said resistor in series with the capacitor so that very little of the voltage between said terminals appears across said second resistor, and hence across said capacitor, while said second resistor is connected across said capacitor, and
   (c) there is provided means responsive to completion of said restoring operation of said closing operator to its reset condition for operating said disabling switch to disconnect said second resistor from across said capacitor.

4. The closing control scheme of claim 1 in which:
   (a) said first disabling means comprises a second resistor and a disabling switch operable during restoration of said closing operator to its reset condition to connect said second resistor across said capacitor, (b) said second resistor has a very low resistance compared to said resistor in series with the capacitor so that very little of the voltage between said terminals appears across said second resistor, and hence across said capacitor, while said second resistor is connected across said capacitor, and (c) there is provided means responsive to completion of said restoring operation of said closing operator to its reset condition for operating said disabling switch to disconnect said second resistor from across said capacitor, (d) said second disabling means comprises said series combination of said actuating part, said manually-controlled switch, and said *b* switch, when connected across said capacitor after capacitor discharge, (e) said series cobination has a very low resistance compared to said resistor in series with the capacitor so that very little of the voltage between said terminals appears across said series combination, and hence across said capacitor, when said series combination is connected across the capacitor in a discharged condition.

5. The closing control scheme of claim 2 in which:

(a) said first disabling means comprises a second resistor and a disabling switch operable during restoration of said closing operator to its reset condition to connect said second resistor across said capacitor, (b) said second resistor has a very low resistance compared to said resistor in series with the capacitor so that very little of the voltage between said terminals appears across said second resistor, and hence across said capacitor, while said second resistor is connected across said capacitor, and (c) there is provided means responsive to completion of said restoring operation of said closing operator to its reset condition for operating said disabling switch to disconnect said second resistor from across said capacitor.

6. The closing control scheme of claim 2 in which:

(a) said first disabling means comprises a second resistor and a disabling switch operable during restoration of said closing operator to its reset condition to connect said second resistor across said capacitor, (b) said second resistor has a very low resistance compared to said resistor in series with the capacitor so that very little of the voltage between said terminals appears across said second resistor, and hence across said capacitor, while said second resistor is connected across said capacitor, and (c) there is provided means responsive to completion of said restoring operation of said closing operator to its reset condition for operating said disabling switch to disconnect said second resistor from across said capacitor, (d) said second disabling means comprises said series combination of said actuating part, said manually-controlled switch, and said *b* switch, when connected across said capacitor after capacitor discharge, (e) said series combination has a very low resistance compared to said resistor in series with the capacitor so that very little of the voltage between said terminals appears across said series combination, and hence across said capacitor, when said series combination is connected across the capacitor in a discharged condition.

References Cited

UNITED STATES PATENTS

| 2,394,039 | 2/1946 | Brown et al. | |
| 2,427,750 | 9/1947 | Snyder | 317—151 |
| 3,116,440 | 12/1963 | Baude | 317—151 X |
| 3,198,987 | 8/1965 | Brown | 317—54 X |

ROBERT K. SCHAEFER, Primary Examiner

T. B. JOIKE, Assistant Examiner

U.S. Cl. X.R.

317—54, 151